(12) United States Patent
Gonze et al.

(10) Patent No.: US 8,464,523 B2
(45) Date of Patent: Jun. 18, 2013

(54) TARGETED PARTICULATE MATTER FILTER REGENERATION SYSTEM

(75) Inventors: Eugene V. Gonze, Pinckney, MI (US);
Halim G. Santoso, Novi, MI (US);
Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 294 days.

(21) Appl. No.: 12/722,846

(22) Filed: Mar. 12, 2010

(65) Prior Publication Data
US 2011/0219752 A1  Sep. 15, 2011

(51) Int. Cl.
*F01N 3/00* (2006.01)

(52) U.S. Cl.
USPC ............ 60/295; 60/286; 60/297; 60/299

(58) Field of Classification Search
USPC ............................................ 60/295, 286
See application file for complete search history.

(56) References Cited

U.S. PATENT DOCUMENTS

| | | | | |
|---|---|---|---|---|
| 4,060,984 A | * | 12/1977 | Paddock | 60/290 |
| 4,134,262 A | * | 1/1979 | Sugihara et al. | 60/289 |
| 4,178,755 A | * | 12/1979 | Klimazewski et al. | 60/290 |
| 4,191,014 A | * | 3/1980 | Jones | 60/290 |
| 5,461,857 A | * | 10/1995 | Itou et al. | 60/276 |
| 7,128,035 B2 | * | 10/2006 | Lancaster et al. | 123/179.18 |
| 2004/0083716 A1 | * | 5/2004 | Twigg | 60/284 |
| 2005/0284138 A1 | * | 12/2005 | Imai et al. | 60/295 |
| 2007/0003455 A1 | * | 1/2007 | Morita et al. | 422/177 |
| 2007/0175208 A1 | * | 8/2007 | Bandl-Konrad et al. | 60/286 |
| 2008/0148712 A1 | * | 6/2008 | Wada et al. | 60/285 |
| 2008/0202223 A1 | * | 8/2008 | Tsujimura et al. | 73/114.31 |
| 2008/0256935 A1 | * | 10/2008 | Oger et al. | 60/299 |
| 2008/0289321 A1 | * | 11/2008 | Lu et al. | 60/299 |

FOREIGN PATENT DOCUMENTS

DE  102005062398  6/2007

OTHER PUBLICATIONS

Office Action dated Oct. 19, 2012 from the German Patent Office for German Patent Application No. DE102011013401.8.

* cited by examiner

*Primary Examiner* — Thomas Denion
*Assistant Examiner* — Jason Shanske

(57) ABSTRACT

A regeneration system includes a particulate matter (PM) filter. The PM filter has an upstream end that receives an exhaust gas from an engine. An air pump circuit directs ambient air to a first exhaust conduit upstream from the PM filter. A control module determines a current soot loading level of the PM filter. The control module also at least one of operates the engine in a rich mode and activates an air pump of the air pump circuit when the current soot loading level is greater than a predetermined soot loading level.

16 Claims, 6 Drawing Sheets

TARGETED PARTICULATE MATTER FILTER REGENERATION SYSTEM

FIELD

The present disclosure relates to regeneration of particulate matter filters of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines produce particulate matter (PM) that is filtered from exhaust gas by a PM filter. The PM filter is disposed in an exhaust system of the engine. The PM filter reduces emission of PM that is generated during combustion. Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy.

As one example, an exhaust system may include a three-way catalyst converter (TWC), an oxidation catalyst (OC) and a particulate matter (PM) filter located downstream from an engine. Exhaust gas from the engine passes through the TWC, followed by the OC and then is filtered by the PM filter. The TWC reduces nitrogen oxides NOx, oxidizes carbon monoxide (CO) and oxidizes unburnt hydrocarbons (HC) and volatile organic compounds. The OC oxides CO remaining in the exhaust received from the TWC.

Continuing from the above example, spark of the engine may be retarded to heat up the engine and thus the exhaust system to initiate regeneration of the PM filter. As a result a large mass is heated including the engine, the TWC, the OC and the PM filter. The mass may be heated to a PM combustion temperature of, for example, 600-750° C. The increased temperatures of exhaust system components can decrease the operating life of the TWC and/or the OC. Also, an increased amount of fuel is required to provide this heating.

SUMMARY

A regeneration system is provided and includes a particulate matter (PM) filter. The PM filter has an upstream end that receives an exhaust gas from an engine. An air pump circuit directs ambient air to a first exhaust conduit upstream from the PM filter. A control module determines a current soot loading level of the PM filter. The control module also at least one of operates the engine in a rich mode and activates an air pump of the air pump circuit when the current soot loading level is greater than a predetermined soot loading level.

In other features, a regeneration method is provided and includes receiving an exhaust gas via an upstream end of a PM filter. A current soot loading level of the PM filter is determined. The method further includes, when the current soot loading level is greater than a predetermined soot loading level, at least one of operating an engine in a rich mode and activating an air pump of an air pump circuit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
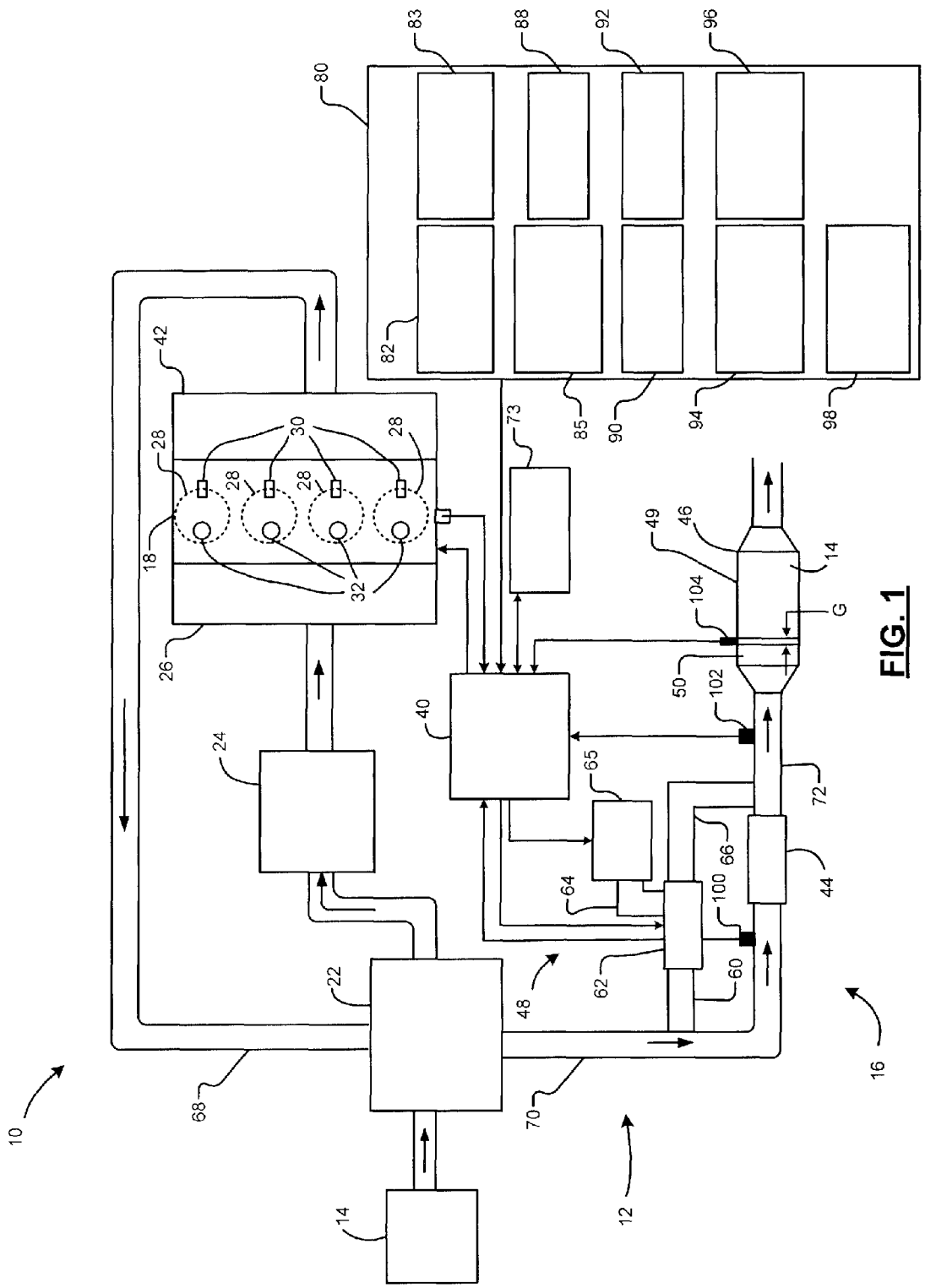
FIG. 1 is a functional block diagram of an exemplary engine system incorporating a regeneration system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, and/or a combinational logic circuit.

In FIG. 1, an exemplary engine system 10 that includes a regeneration system 12 is schematically illustrated. The regeneration system 12 targets a particulate matter (PM) filter 14 of an exhaust system 16 during regeneration by directly heating the PM filter 14 to a regeneration temperature. The heating of the PM filter 14 is performed without increasing temperatures of an engine 18 and/or components of the exhaust system 16 upstream from the PM filter 14 above normal operating temperatures (e.g., 93-121° C. for an engine and 200-300° C. for exhaust system components upstream from a PM filter). Although the engine system 10 is shown as a spark ignition engine, the engine system 10 is provided as an example. The regeneration system 12 may be implemented on various other engine systems, such as diesel engine systems.

The engine system 10 includes the engine 18 that combusts an air and fuel mixture to produce drive torque. Air enters the engine 18 by passing through an air filter 20. Air passes through the air filter 20 and may be drawn into a turbocharger 22. The turbocharger 22 when included compresses the fresh air. The greater the compression, the greater the output of the engine 18. The compressed air passes through an air cooler 24 when included before entering an intake manifold 26.

Air within the intake manifold 26 is distributed into cylinders 28. Fuel is injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The regeneration system 12 includes the exhaust system 16 and a control module 40. The exhaust system 16 includes the control module 40, an exhaust manifold 42, a first three-way converter (TWC) 44, a 4-way converter (FWC) 46 and an air pump circuit 48. Optionally, an EGR valve (not shown) recirculates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 through the first TWC 44 and into the FWC 46.

The first TWC 44 reduces nitrogen oxides NOx, oxidizes carbon monoxide (CO) and oxidizes unburnt hydrocarbons (HC) and volatile organic compounds. The first TWC 44 oxidizes the exhaust based on the post combustion air/fuel ratio. The amount of oxidation increases the temperature of the exhaust.

The FWC 46 includes the PM filter 14, a housing 49, an oxidation catalyst (OC) (closed coupled catalyst) and/or a second TWC 50. The PM filter 14 and the second TWC 50 are disposed within the housing 49 and have respective upstream and downstream ends. The second TWC 50 may by in contact with the PM filter 14 or may be separated from the PM filter 14 by a gap G to alter flow of exhaust between the PM filter 14 and the second TWC 50. The second TWC 50 also oxides CO remaining in the exhaust received from the first TWC 44 to generate $CO_2$. The second TWC 50 may also reduce nitrogen oxides NO and oxidize unburnt hydrocarbons (HC) and volatile organic compounds. The PM filter 14 receives exhaust from the second TWC 50 and filters any soot particulates present in the exhaust.

The air pump circuit 48 includes a first air conduit 60, an air valve 62, a second air conduit 64, an air pump 65, and a third air conduit 66. The first air conduit 60 is connected between the exhaust manifold 42 and the air valve 62. The first air conduit 60 may be directly connected to the exhaust manifold 42 or to an exhaust conduit upstream from the first TWC 44, such as to an exhaust conduit 68 between the exhaust manifold 42 and the turbo 22 or to an exhaust conduit 70 between the turbo 22 and the first TWC 44. The second air conduit 64 is connected between the air valve 62 and the air pump 65. The third air conduit 66 is connected between the air valve 62 and the FWC 46. The third air conduit 66 may be connected to an exhaust conduit 72 between the first TWC 44 and the FWC 46.

The air valve 62 has two operating positions and corresponding modes. During the first mode, the air valve 62 is in a first position. The first mode may be referred to as a cold start mode. Ambient air is directed to the first air conduit 60 using the air pump 65 when in the first mode. The ambient air may be directed to the exhaust manifold 42 and/or exhaust valves of the engine 18.

During the second mode, the air valve 62 is in a second position. The second mode may be referred to as a regeneration mode or a rich operating mode. During the regeneration mode and the rich operating mode, ambient air is directed the third air and/or exhaust conduits 66, 72 using the air pump 65.

The control module 40 controls the engine 18, the position of the air valve 62, the air pump 65, and PM filter regeneration based on various sensed information and soot loading. More specifically, the control module 40 estimates loading of the PM filter 14. When the estimated loading is at a predetermined level and/or the exhaust flow rate is within a desired range, operation of the engine 18, position of the air valve 62, and state of the air pump 65 are controlled to initiate the regeneration process. The duration of the regeneration process may be varied based upon the estimated amount of PM within the PM filter 14.

During regeneration, the engine 18 is operated in the rich mode and ambient air is directed to the third air and exhaust conduits 66, 72 to heat the second TWC 50 up to regeneration temperatures. The engine 18 may be operated in the rich mode and ambient air may be directed to the third air and exhaust conduits 66, 72 based on a timer 73. The timer 73 may be part of the control module 40 or may be a separate timer, as shown. The remainder of the regeneration process is achieved using the heat generated by the heated exhaust passing through the PM filter 14.

The above system may include sensors 80 for determining exhaust flow levels, exhaust temperature levels, exhaust pressure levels, oxygen levels, intake air flow rates, intake air pressure, intake air temperature, engine speed, EGR, etc. Exhaust flow sensors 82, exhaust temperature sensors 83, exhaust pressure sensors 85, oxygen sensor 88, an EGR sensor 90, an intake air flow sensor 92, an intake air pressure sensor 94, an intake air temperature sensor 96, and an engine speed sensor 98 are shown.

A first exhaust flow, pressure and/or temperature sensor 100 may be connected to the first air conduit 60 and upstream from the first TWC 44. A second exhaust flow, pressure and/or temperature sensor 102 may be connected to the exhaust conduit 72 and between the first TWC 44 and the FWC 46. A third exhaust flow, pressure and/or temperature sensor 104 may be connected to the FWC 46. The third exhaust sensor 104 may detect temperature of exhaust, for example, in the gap G. The control module 40 may operate the engine 18 and the exhaust system 16 in the cold start mode, the rich mode, and the regeneration mode based on the information from the sensors 80 and the first, second and third sensors 100, 102, 104.

Figure 2:
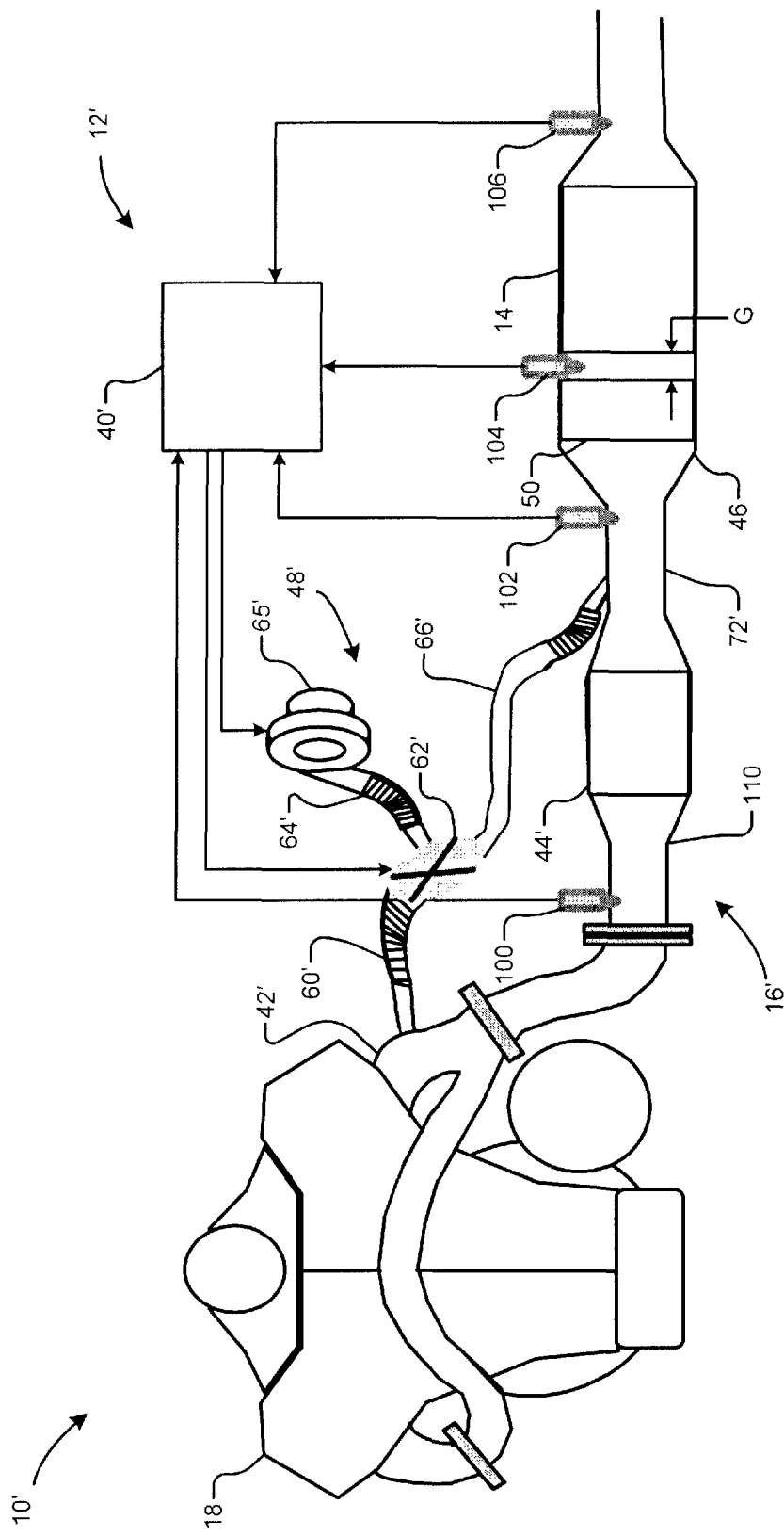
FIG. 2 is a functional block diagram of another engine system and corresponding regeneration system in accordance with an embodiment of the present disclosure.

In FIG. 2, a functional block diagram of another engine system 10' and corresponding regeneration system 12' is shown. The engine system 10' may be part of the engine system 10. The regeneration system 12' includes the engine 18, an exhaust system 16' and an air pump circuit 48'. The engine 18 may be, for example, a spark ignition or diesel engine. The exhaust system 16' includes an exhaust manifold 42', a first TWC 44', an exhaust conduit 72' and the FWC 46. The air pump circuit 48' includes an air valve 62', an air pump 65', and first, second and third air conduits 60', 64', 66'.

The regeneration system 12' also includes a control module 40' that controls operation of the engine 18, the air valve 62' and the air pump 65' based on information from first, second, third and fourth flow, pressure and/or temperature exhaust sensors 100, 102, 104, 106. The first exhaust sensor 100 is connected upstream of the first TWC 44' on the exhaust manifold 42' or on an exhaust conduit 110 between the exhaust manifold 42' and the first TWC 44'. The second exhaust sensor 102 is connected to the exhaust conduit 72'. The third exhaust sensor 104 is connected to the FWC 46. The fourth exhaust sensor 106 is connected to an exhaust conduit 112 downstream of the FWC 46.

Figure 3:
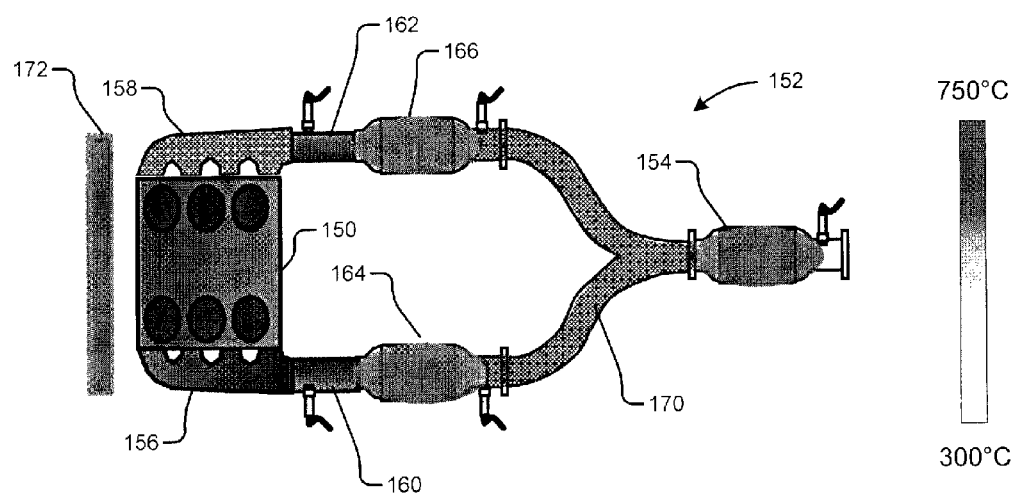
FIG. 3 is a thermal view of an engine and a corresponding exhaust system.

In FIG. 3, a thermal view of an engine 150 and a corresponding exhaust system 152 is shown. The thermal view illustrates heating of the engine 150 and the exhaust system 152 when performing regeneration using, for example, spark retard to heat a PM filter of a FWC 154. The exhaust system 152 includes a left side 156 and a right side 158 that include respective left and right exhaust conduits 160, 162 and TWCs 164, 166. A Y-shaped member 170 is connected between the TWCs 164, 166 and the FWC 154.

In order to increases temperature of the OC of the FWC 154 to a regeneration temperature, spark is retarded and fuel supplied to the engine 150 is increased. Fuel quantity supplied is increased to maintain stoichiometry and to heat a large mass. The large mass refers to the engine 150, the left and right sides 156, 158, the Y-shaped member 170 and the FWC 154. Temperature of a radiator 172 is also increased. The method of FIG. 3, which is used to increase the temperature of the OC of the FWC 154, is inefficient, increases temperatures of components upstream of the FWC 154 and reduces fuel economy.

Targeted PM filter heating techniques described herein provide fuel efficient regeneration of a PM filter without increasing temperatures of an engine and exhaust components upstream of a PM filter housing and/or a FWC. An example of this reduced heating is shown in FIG. 4.

Figure 4:
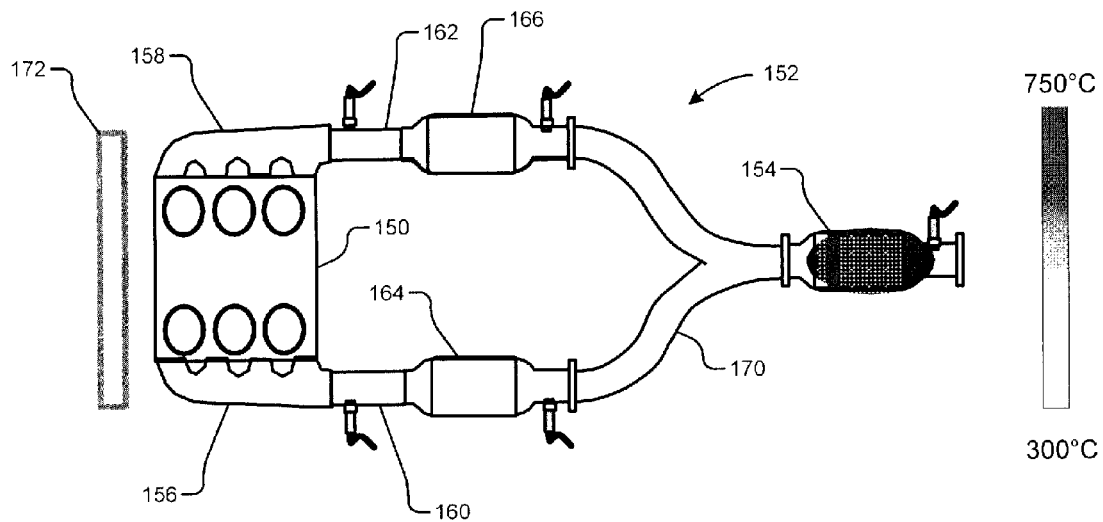
FIG. 4 is a thermal view of the engine and corresponding exhaust system of FIG. 3 operating in accordance with an embodiment of the present disclosure.

In FIG. 4, a thermal view of the engine 150 and the corresponding exhaust system 152 operating based on a targeted PM filter method described herein is shown. Before and during regeneration the FWC 154 is heated to regeneration temperatures. The FWC 154 may be the only exhaust component that is increased in temperature to a regeneration temperature. The engine 150, the left and right sides 156, 158, the exhaust conduits 160, 162, the DA/Cs 164, 166, the Y-shaped member 170 and the radiator 172 remain at normal operating temperatures. As a result, the FWC 154 and/or the OC and PM filter of the FWC 154 are targeted for an increase to regeneration temperatures. The FWC 154 may be targeted using the methods of FIGS. 6A and 6B, described below.

Figure 5:
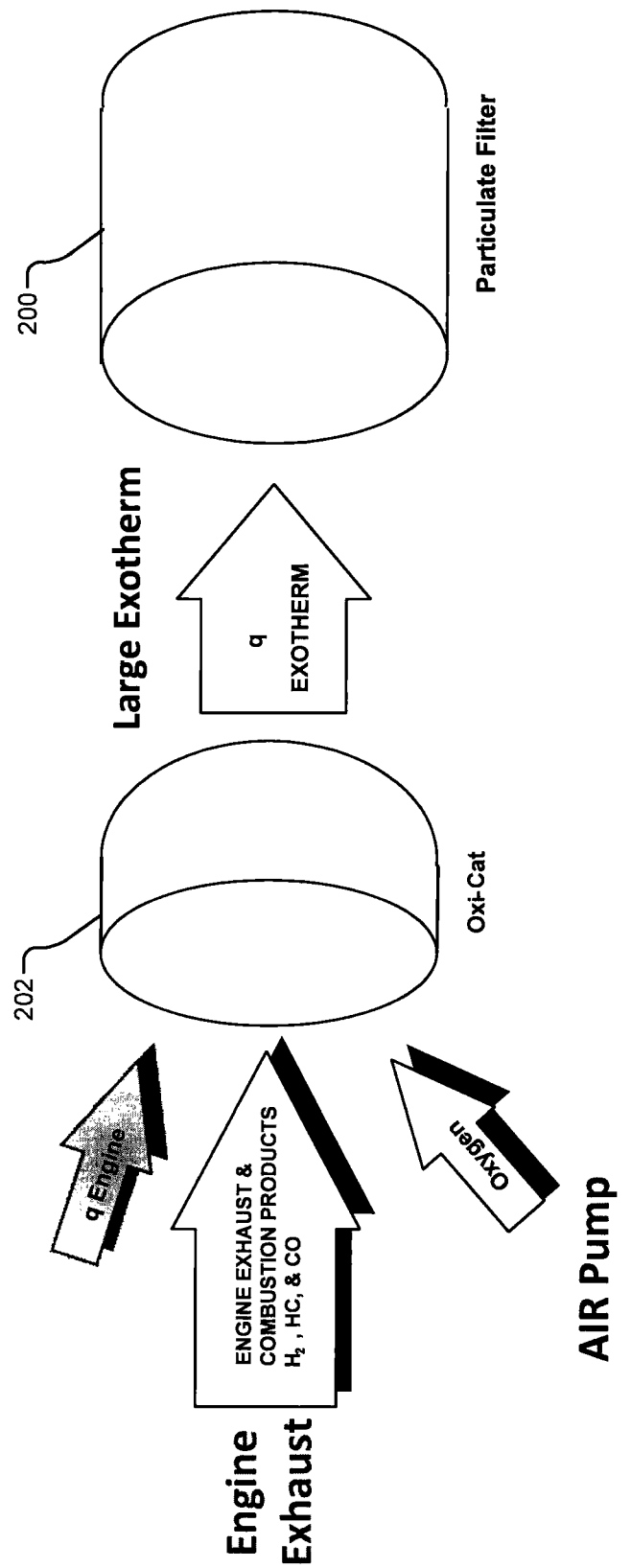
FIG. 5 is an exothermic exhaust diagram in accordance with an embodiment of the present disclosure.

In FIG. 5, an exothermic exhaust diagram is shown. To initiate a regeneration of particulates in a PM filter 200, an engine may be operated in the rich mode. The rich mode refers to operating the engine at an air/fuel ratio that is richer than a stoichiometric ratio. Oxygen within an exhaust system is reduced when an engine is operated in the rich mode. Since the oxygen level in the exhaust system is reduced, ambient air is pumped into the exhaust system to allow the OC 202 in, for example, a FWC to convert CO to carbon dioxide ($CO_2$). This conversion causes temperature of the OC 202 to increase.

The OC 202 receives thermal energy and exhaust gases, which include combustion products, such as hydrogen ($H_2$), hydrocarbons (HC), and carbon monoxide (CO), from the engine. The OC 202 also receives oxygen ($O_2$) from an air pump. The OC 202 oxidizes the CO and HC and increases in temperature, which initiates a large exothermic reaction that passes to the PM filter 200 and travels along the PM filter 200 while burning PM in the PM filter 200. Temperature of the OC 202 is increased to a regeneration temperature. A quick converter light off provides reduced cold start emissions. This is provided by the target PM filter embodiments described herein.

Figure 6A:
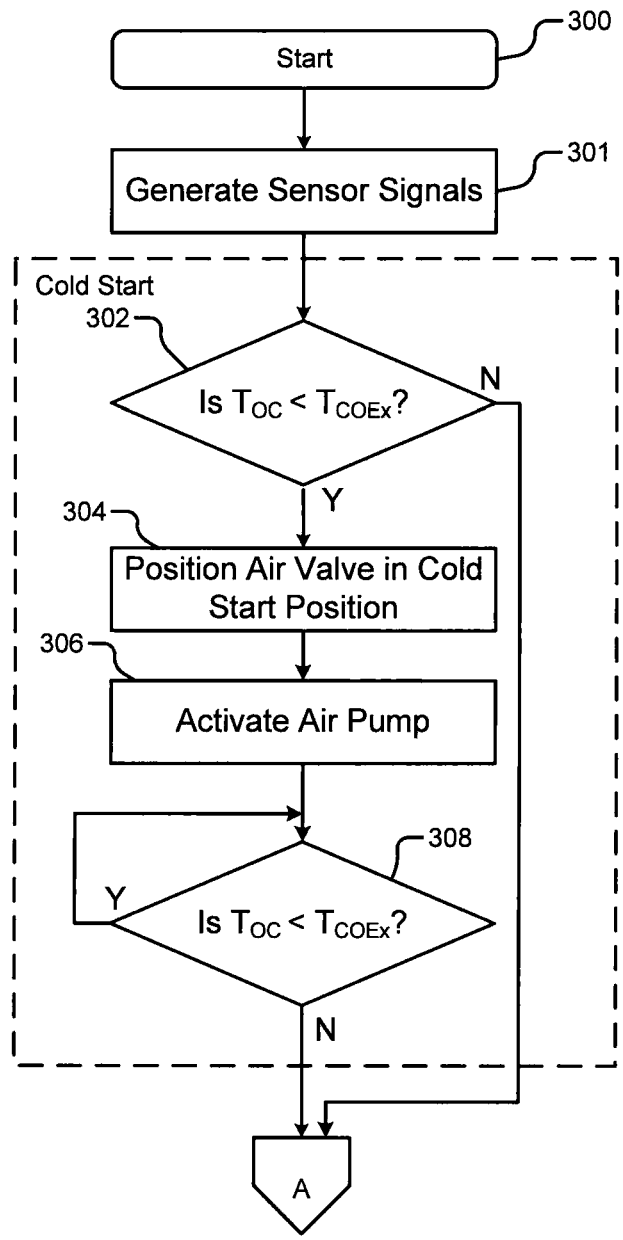
FIGS. 6A and 6B is a logic flow diagram illustrating cold start and regeneration methods in accordance with an embodiment of the present disclosure.
Figure 6B:
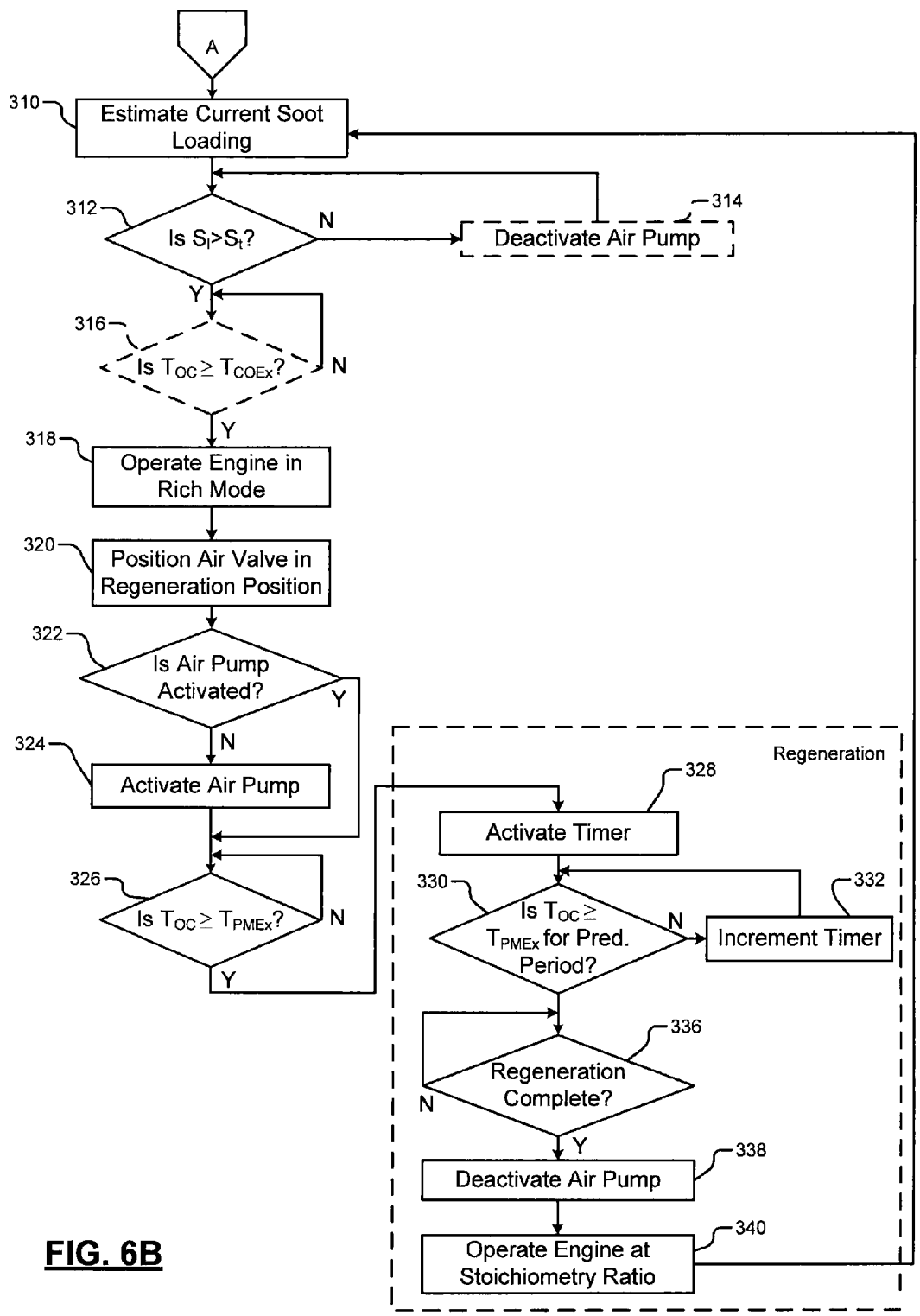

In FIGS. 6A and 6B, a logic flow diagram illustrating cold start and regeneration methods is shown. Although the method is described primarily with respect to the embodiments of FIGS. 1, 2, 4 and 5, the method may be applied to other embodiments of the present disclosure. The method may begin at 300. Below described control may be performed by one of the control modules 40, 40' of FIGS. 1 and 2.

At 301, sensor signals are generated. The sensor signals may include exhaust flow signals, exhaust temperature signals, exhaust pressure signals, an oxygen signal, an intake air flow signal, an intake air pressure signal, an intake air temperature signal, an engine speed signal, an EGR signal, etc., which may be generated by the above-described sensors 80 and 100-106 of FIGS. 1 and 2.

At 302, control determines whether the current temperature of the OC and/or FWC (e.g., the OC of the second TWC 50 and FWC 46) $T_{OC}$ is less than a CO exothermic temperature $T_{COEx}$ (first predetermined temperature). In one embodiment, the CO exothermic temperature $T_{COEx}$ is 250° C. In another embodiment, the CO exothermic temperature $T_{COEx}$ is 300° C. The temperature $T_{OC}$ may be determined, for example, based on information from the exhaust sensor 104 and/or using equations 1 and 2. $T_{Start}$ is the starting temperature of the OC and/or FWC. $E_{AddedMass}$ is the mass of, for example, the CO, $H_2$, and HC provided to the OC. HL is the heat loss of the OC. K is a constant. $F_E$ is exhaust flow, which may be a function of mass air flow and fuel quantity supplied to cylinders of an engine (e.g., cylinders 28). The mass air flow may be determined by a mass air flow sensor, such as the intake air flow sensor 92.

$$T_{OC}=T_{Start}+\{E_{AddedMass}-\text{HL}\} \quad (1)$$

$$\text{HL}=K_2 \times F_E \times T_{inlet} \quad (2)$$

Control proceeds to 304 when the current temperature $T_{OC}$ is less than the CO exothermic temperature $T_{COEx}$, otherwise control proceeds to 310.

At 304, the air valve (e.g., the air valve 62 or 62') is positioned to the first position for an engine cold start. In the first position, air may pass from the air valve to the exhaust manifold (e.g., the exhaust manifold 42 or 42'), but not from the air valve to a point downstream of the first TWC (e.g., the first TWC 44, 44'). At 306, the air pump (e.g., the air pump 45 or 45') is activated to pump air into the exhaust manifold.

At 308, control again determines whether the current temperature $T_{OC}$ is less than the CO exothermic temperature $T_{COEx}$. Control proceeds to 310 when the current temperature $T_{OC}$ is greater than or equal to the CO exothermic temperature $T_{COEx}$. Tasks performed at 302-308 allow temperature of the exhaust system to increase to normal operating temperatures. This quickly increases temperatures of the OCs of the exhaust system to temperatures for oxidization. The air pump may be deactivated when the current temperature $T_{OC}$ is greater than or equal to the CO exothermic temperature $T_{COEx}$.

At 310, control estimates soot loading of the PM filter (e.g., the PM filter 14) from parameters, such as vehicle mileage, exhaust pressure, exhaust drop off pressure across the PM filter, by a predictive method, etc. Mileage refers to vehicle mileage, which approximately corresponds to or can be used to estimate vehicle engine operating time and/or the amount of exhaust gas generated. As an example, regeneration may be performed when a vehicle has traveled approximately 200-300 miles. The amount of soot generated depends upon vehicle operation over time. At idle speeds less soot is generated than when operating at travel speeds. The amount of exhaust gas generated is related to the state of soot loading in the PM filter.

Exhaust pressure can be used to estimate the amount of exhaust generated over a period of time. When an exhaust pressure exceeds a predetermined level or when an exhaust pressure decreases below a predetermined level, regeneration may be performed. For example when exhaust pressure entering a PM filter exceeds a predetermined level, regeneration may be performed. As another example when exhaust pressure exiting a PM filter is below a predetermined level, regeneration may be performed.

Exhaust drop off pressure may be used to estimate the amount of soot in a PM filter. For example, as the drop off pressure increases the amount of soot loading increases. The exhaust drop off pressure may be determined by determining pressure of exhaust entering a PM filter minus pressure of exhaust exiting the PM filter. Exhaust system pressure sensors may be used to provide these pressures.

The predictive method may include the determination of one or more engine operating conditions, such as engine load, fueling schemes (patterns, volumes, etc.), fuel injection timing, and EGR, and an exhaust gas recirculation (EGR) level. A cumulative weighting factor may be used based on the engine conditions. The cumulative weighting factor is related to soot loading. When the cumulative weighting factor exceeds a threshold, regeneration may be performed.

At 312, control determines whether the current soot loading $S_l$ is greater than a soot loading threshold $S_{l'}$. Control proceeds to 316 when the current soot loading $S_l$ is greater than the lower threshold $S_{l'}$, otherwise control proceeds to 314. At 314, control may deactivate the air pump if not deactivated after 308. At 316, control determines whether the current temperature $T_{OC}$ is greater than or equal to the CO exothermic temperature $T_{COEx}$. Control proceeds to 318 when the current temperature $T_{OC}$ is greater than or equal to the CO exothermic temperature $T_{COEx}$. Controls allows the OC and/or FWC to heat up to the CO exothermic temperature $T_{COEx}$ through normal operation of the engine (e.g., operating in the stoichiometric mode) and exhaust system (e.g. the air pump is deactivated).

At 318, control operates the engine in the rich mode to generate CO and HC. The rich mode is used to heat the OC and/or the FWC up to regeneration temperatures. The OC and/or the FWC oxidizes the CO and HC. The OC and/or FWC are increased in temperature, for example, from a normal operating temperature to a regeneration temperature.

At 320, control signals the air valve to switch to the second or regeneration position. At 322, control determines whether the air pump is activated. Control proceeds to 324 when the air pump is not activated. Control proceeds to 326 when the air pump is activated. At 324, the air pump is activated.

By operating the engine in the rich mode, the air valve in the second position and the air pump in the activated state, the regeneration system removes NOx via the first TWC and converts HC and CO via the second TWC. This is performed during regeneration of the PM filter. This reduces NOx and, HC and CO emissions during regeneration. Although the first TWC is oxygen deprived due to the engine operating in the rich mode, the oxygen is provided down stream from the first TWC to allow the OC of the FWC to oxidize received HC and CO.

At 326, control determines whether the current temperature $T_{OC}$ is greater than or equal to a PM exothermic temperature $T_{PMEx}$ (second predetermined temperature). Control allows the current temperature $T_{OC}$ to gradually increase or ramp up to the PM exothermic temperature $T_{PMEx}$. Regeneration of the PM filter may begin when temperature of the OC, PM filter and/or FWC is greater than or equal to the PM exothermic temperature $T_{PMEx}$ for a predetermined period. The PM exothermic temperature (minimum temperature) of the OC, PM filter and/or FWC is obtained to start soot burning. For example only, the minimum temperature may be approximately 350-650° C. depending on whether the PM filter is catalyzed. In one embodiment, the minimum temperature is approximately 600-650° C. This provides uniform heating of the PM filter. Control proceeds to 328 when the current temperature $T_{OC}$ is greater than or equal to a PM exothermic temperature $T_{PMEx}$.

At 328, a timer is activated. The timer is used to determine whether the current temperature $T_{OC}$ is greater than or equal to a PM exothermic temperature $T_{PMEx}$ for the predetermined period.

At 330, control determines whether the current temperature $T_{OC}$ is greater than or equal to a PM exothermic temperature $T_{PMEx}$ for the predetermined period. Control proceeds to 336 when the timer is greater than or equal to the predetermined period, otherwise to 332. At 332, the timer is incremented.

At 338 and 340, the air pump may be deactivated and the engine may be operated in a stoichiometric mode. The rich mode operation may be deactivated when a sufficient PM temperature is reached. The engine may operate in the rich mode only long enough for combustion of the soot and then may be returned to a stoichiometric operating mode. After 340, control may return to 310.

The above-described tasks performed at 301-340 are meant to be illustrative examples; the tasks may be performed sequentially, synchronously, simultaneously, continuously, during overlapping time periods or in a different order depending upon the application.

In use, the control module determines when the PM filter requires regeneration. The determination is based on soot levels within the PM filter. Alternately, regeneration can be performed periodically or on an event basis. The control module may estimate when the entire PM filter needs regeneration or when zones within the PM filter need regeneration.

The targeted PM filter methods of the present disclosure minimize fuel used and the number of components that are increased in temperature during regeneration. This increases life of exhaust components, such as a TWC connected upstream of a housing of a PM filter. The targeted PM filter methods of the present disclosure provide a fully capable exhaust system including the removal of NOx and the conversion of HC and CO during regeneration of a PM filter.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration system comprising:
 a 3-way converter that receives an exhaust gas from an engine;
 an oxidation catalyst that receives the exhaust gas from the 3-way converter;
 a particulate matter (PM) filter downstream from the oxidation catalyst and comprising an upstream end to receive the exhaust gas from the oxidation catalyst;
 an air pump circuit that directs ambient air to the PM filter and not to the 3-way converter, wherein the ambient air is directed to the PM filter via an exhaust conduit connected between the 3-way converter and the oxidation catalyst, wherein the oxidation catalyst is connected between the exhaust conduit and the PM filter;
 a control module that:
  determines a temperature of the oxidation catalyst, wherein the oxidation catalyst is downstream from the 3-way converter and upstream from the PM filter;
  determines a soot loading level of the PM filter; and
  operates the engine in a rich mode and activates an air pump of the air pump circuit in response to the soot loading level being greater than a predetermined soot loading level and in response to the temperature being greater than a first predetermined temperature; and an air valve of the air pump circuit configured to direct the ambient air into (i) an exhaust manifold of the engine while the air valve is in a first position, and (ii) the exhaust conduit while the air valve is in a second position, wherein the control module:
compares the temperature to the first predetermined temperature and a second predetermined temperature, wherein the second predetermined temperature is less than the first predetermined temperature;
activates the air pump and adjusts the air valve to the first position in response to the temperature being less than the second predetermined temperature;
deactivates the air pump in response to the temperature being (i) greater than the second predetermined temperature, and (ii) less than the first predetermined temperature; and
activates the air pump and adjusts the air valve to the second position in response to the temperature being greater than the first predetermined temperature.

2. The regeneration system of claim 1, wherein the control module increases the temperature of the oxidation catalyst upstream from the PM filter to a regeneration temperature by operating the engine in the rich mode and by activating the air pump to direct ambient air to the oxidation catalyst.

3. The regeneration system of claim 1, wherein the air pump circuit comprises:
the air valve;
a first air conduit that is connected between the exhaust manifold and the air valve;
a second air conduit that is connected between the air pump and the air valve; and
a third air conduit that is connected between the air valve and the exhaust conduit.

4. The regeneration system of claim 1, wherein the second predetermined temperature is a carbon monoxide exothermic temperature.

5. The regeneration system of claim 1, wherein the second first predetermined temperature is a PM exothermic temperature.

6. The regeneration system of claim 1, wherein the control module maintains the engine in the rich mode and maintains activation of the air pump until the temperature is greater than or equal to the first predetermined temperature for a predetermined period.

7. The regeneration system of claim 6, wherein the control module deactivates the air pump and operates the engine in a stoichiometric mode in response to the temperature being greater than or equal to the first predetermined temperature for the predetermined period.

8. The system of claim 1, comprising a 4-way converter that comprises the oxidation catalyst and the PM filter.

9. A regeneration method comprising:
receiving an exhaust gas from an engine at a 3-way converter;
receiving the exhaust gas from the 3-way converter via an oxidation catalyst;
receiving the exhaust gas from the oxidation catalyst via an upstream end of a particulate matter (PM) filter;
determining a temperature of the oxidation catalyst, wherein the oxidation catalyst is downstream from the 3-way converter and upstream from the PM filter;
determining a soot loading level of the PM filter;
in response to the soot loading level being greater than a predetermined soot loading level and in response to the temperature being greater than a first predetermined temperature, operating the engine in a rich mode and activating an air pump of an air pump circuit to direct ambient air to the PM filter and not to the 3-way converter, wherein the ambient air is directed to the PM filter via an exhaust conduit connected between the 3-way converter and the oxidation catalyst, wherein the oxidation catalyst is connected between the exhaust conduit and the PM filter;
directing the ambient air via an air valve of the air pump circuit into (i) an exhaust manifold of the engine while the air valve is in a first position, and (ii) the exhaust conduit while the air valve is in a second position;
comparing the temperature to the first predetermined temperature and a second predetermined temperature, wherein the second predetermined temperature is less than the first predetermined temperature;
activating the air pump and adjusting the air valve to the first position in response to the temperature being less than the second predetermined temperature;
deactivating the air pump in response to the temperature being (i) greater than the second predetermined temperature, and (ii) less than the first predetermined temperature; and
activating the air pump and adjusting the air valve to the second position in response to the temperature being greater than the first predetermined temperature.

10. The regeneration method of claim 9, comprising increasing the temperature of the oxidation catalyst upstream from the PM filter to a regeneration temperature by operating the engine in the rich mode and by activating the air pump to direct ambient air to the oxidation catalyst.

11. The regeneration method of claim 9, wherein the second predetermined temperature is a carbon monoxide exothermic temperature.

12. The regeneration method of claim 9, further comprising at least one of maintaining the engine in the rich mode and maintaining activation of the air pump until the temperature is greater than or equal to the first predetermined temperature.

13. The regeneration method of claim 12, wherein the first predetermined temperature is a PM exothermic temperature.

14. The regeneration method of claim 12, further comprising maintaining the engine in the rich mode and maintaining activation of the air pump until the temperature is greater than or equal to the first predetermined temperature for a predetermined period.

15. The regeneration method of claim 14, further comprising deactivating the air pump and operating the engine in a stoichiometric mode in response to the temperature being greater than or equal to the first predetermined temperature for the predetermined period.

16. The regeneration system of claim 1, wherein:
the control module activates the air pump while the air valve is in the first position during a cold start of the engine; and
the cold start refers to when a temperature of the engine is less than a third predetermined temperature.

* * * * *